United States Patent
Fuelling et al.

(10) Patent No.: US 7,172,164 B2
(45) Date of Patent: Feb. 6, 2007

(54) MODULAR ACCESSORY HOLDER

(76) Inventors: Richard A. Fuelling, 120 16th Ave. NE., St. Petersburg, FL (US) 33704; Michael W. Rowan, 535 13th Ave. NE., Saint Petersburg, FL (US) 33701

( * ) Notice: Subject to any disclaimer, the term of this patent is extended or adjusted under 35 U.S.C. 154(b) by 31 days.

(21) Appl. No.: 10/624,152

(22) Filed: Jul. 21, 2003

(65) Prior Publication Data
US 2005/0017147 A1   Jan. 27, 2005

(51) Int. Cl.
*A47F 5/00*   (2006.01)
*A47F 7/00*   (2006.01)
(52) U.S. Cl. .................. 248/314; 248/309.1; 43/21.2
(58) Field of Classification Search ............ 248/311.2, 248/314, 309.1; 43/19.2, 21.2, 22, 23; 211/70.8
See application file for complete search history.

(56) References Cited

U.S. PATENT DOCUMENTS

| | | | | |
|---|---|---|---|---|
| 1,787,734 A | * | 1/1931 | Rowling | ................. 248/73 |
| 2,174,140 A | | 9/1939 | Schofield | |
| 3,543,432 A | | 12/1970 | Gates | |
| 3,622,116 A | * | 11/1971 | Fellows | ................. 248/467 |
| 3,802,652 A | | 4/1974 | Holton, Jr. | |
| 3,870,259 A | | 3/1975 | Reynolds | |
| 4,088,848 A | * | 5/1978 | Weed | ................. 248/314 |
| 4,157,803 A | | 6/1979 | Mack | |
| 4,176,580 A | * | 12/1979 | Gallegos | ................. 84/327 |
| 4,468,878 A | | 9/1984 | Maher | |
| 5,014,458 A | | 5/1991 | Wagner | |
| 5,063,702 A | | 11/1991 | Williams | |
| 5,086,958 A | * | 2/1992 | Nagy | ................. 224/544 |
| 5,321,904 A | | 6/1994 | Benson | |
| 5,463,973 A | | 11/1995 | Tait | |
| 6,637,707 B1 | * | 10/2003 | Gates et al. | ............ 248/224.7 |

* cited by examiner

*Primary Examiner*—Amy J. Sterling
(74) *Attorney, Agent, or Firm*—John Wiley Horton

(57) ABSTRACT

A receiver and plate for removably mounting devices to a surface on a boat or other vehicle. The receiver's top surface opens into a vertical slot with tapering side walls. The separate plate slides into this slot. The separate plate has corresponding side walls that mate with the tapering side walls in the receiver. A pair of horizontal steps on the plate come to rest against the receiver's top surface. Although the side walls of the plate rest closely against the side walls of the slot in order to minimize relative motion, the mating of the pair of steps to the receiver's top surface prevents the plate from becoming jammed in the receiver. The plate is used as the base member for a variety of holding devices. Different plates can be configured to mount fishing rod holders, lighting masts, navigation equipments, radios, and the like. The user can easily interchange this equipment in a desired position on the boat by removing a plate with a first piece of equipment from the receiver and replacing it with a plate mounting a second piece of equipment. A locking device is optionally provided to lock the plate securely in the receiver.

3 Claims, 10 Drawing Sheets

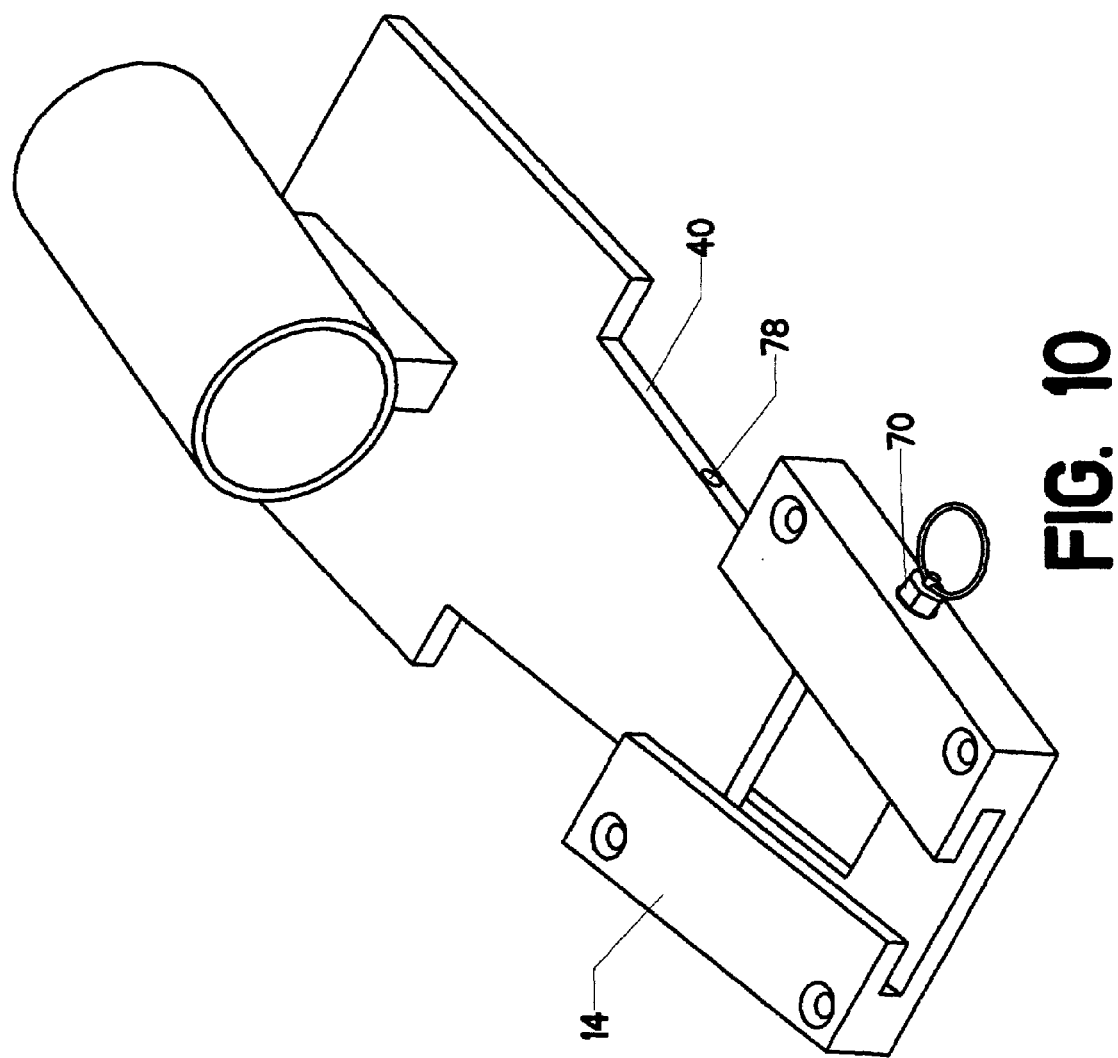

MODULAR ACCESSORY HOLDER

CROSS-REFERENCES TO RELATED APPLICATIONS

Not applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates primarily to the field of mounting hardware. More specifically, the invention comprises a receiver attached to a fixed position. A detachable mounting plate can be used to mount fishing rods, lights, radios, and the like to the receiver.

2. Description of the Related Art

A wide variety of equipment is used on fishing and recreational boats. Examples of such equipment include radios, speakers, navigation systems, lights, fishing rod holders, downrigger holders, and similar items. Many of these devices must be attached to the boat in a permanent fashion, such as by using screws. Once in position, it is difficult to remove such devices for storage. This makes the devices susceptible to theft or damage when the boat is left unattended. In saltwater environments, some of the devices may also be subject to rapid corrosion. Thus, it is desirable to provide a system whereby such accessories can be easily removed.

In addition, many accessories are only used sporadically. The prior art approach typically mounts all these devices in a fixed state, meaning that the boat becomes cluttered with a number of devices that are not actually being used. One good example would be the mounting of an interior lighting mast near a fishing rod holder. It is unlikely that the lighting mast will be used at the same time as the rod holder (since fishing is not typically done at night). A single mount which can hold a variety of different devices is therefore desirable, since it will allow the user to place only those items actually being used in position.

Multiple mounts placed around the vessel also allow the accessories to be used in different locations at different times. As one example, a portable charcoal grill must be mounted in different positions depending on the prevailing winds. Thus, it is desirable to have a mounting system which permits the location of various accessories to be changed.

BRIEF SUMMARY OF THE PRESENT INVENTION

With particular reference to FIG. 4, the present invention comprises a receiver which is permanently mounted to a surface on a boat or other vehicle. The receiver's top surface opens into a vertical slot with tapering side walls. A separate plate slides into this slot. The separate plate has corresponding side walls that mate with the tapering side walls in the receiver. A pair of horizontal steps on the plate come to rest against the receiver's top surface. Although the side walls of the plate rest closely against the side walls of the slot in order to minimize relative motion, the mating of the pair of steps to the receiver's top surface prevents the plate from becoming jammed in the receiver.

The plate is used as the base member for a variety of holding devices. Different plates can be configured to mount fishing rod holders, tackle, lighting masts, navigation equipments, radios, cup holders, cooking grills, tables, small motors, and the like. The user can easily interchange this equipment in a desired position on the boat by removing a plate with a first piece of equipment from the receiver and replacing it with a plate mounting a second piece of equipment. A locking device is optionally provided to lock the plate securely in the receiver.

BRIEF DESCRIPTION OF THE SEVERAL VIEWS OF THE DRAWINGS

FIG. 10 is an isometric view, showing how the pull pin is used to lock the plate within the receiver.

REFERENCE NUMERALS IN THE DRAWINGS

| 10 | boat | 12 | gunwale |
|----|------|----|---------|
| 14 | receiver | 16 | mounting hole |
| 18 | fastener | 20 | top surface |
| 22 | back wall | 24 | side wall |
| 28 | slot | 30 | front wall |
| 32 | modular mount | 34 | plate |
| 36 | tang | 38 | step |
| 40 | side wall | 42 | rod holder |
| 44 | gusset | 46 | GPS unit |
| 50 | drink holder | 52 | gimbaled drink mount |
| 54 | radio holder | 56 | radio |
| 58 | speaker holder | 60 | speaker |
| 62 | GPS holder | 64 | light holder |
| 66 | light | 68 | open front |
| 70 | pull pin | 72 | body |
| 74 | plunger | 76 | ring |
| 78 | hole | | |

DETAILED DESCRIPTION OF THE INVENTION

Figure 1:
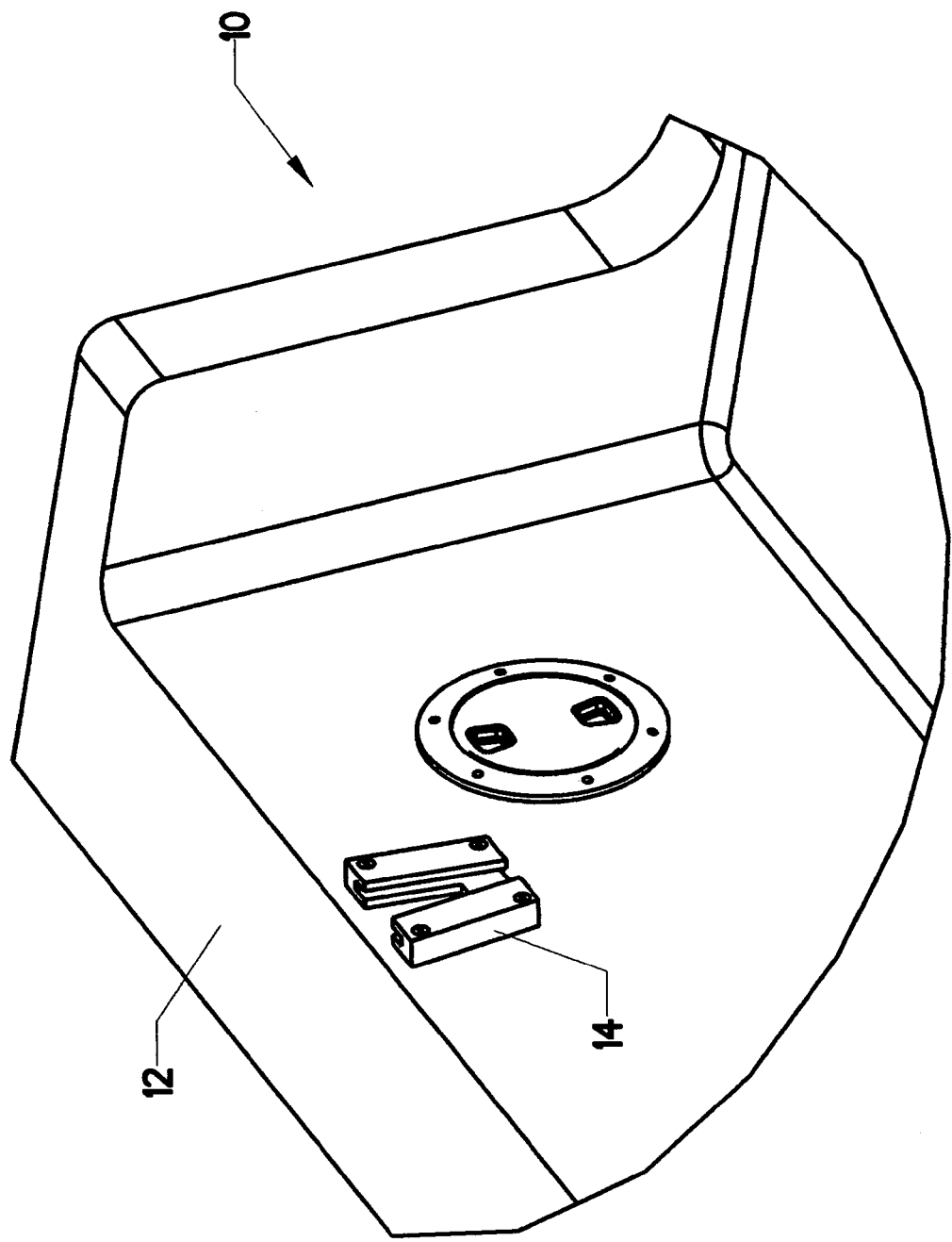
FIG. 1 is a perspective view, showing a receiver mounted on the gunwale of a boat.
Figure 2:
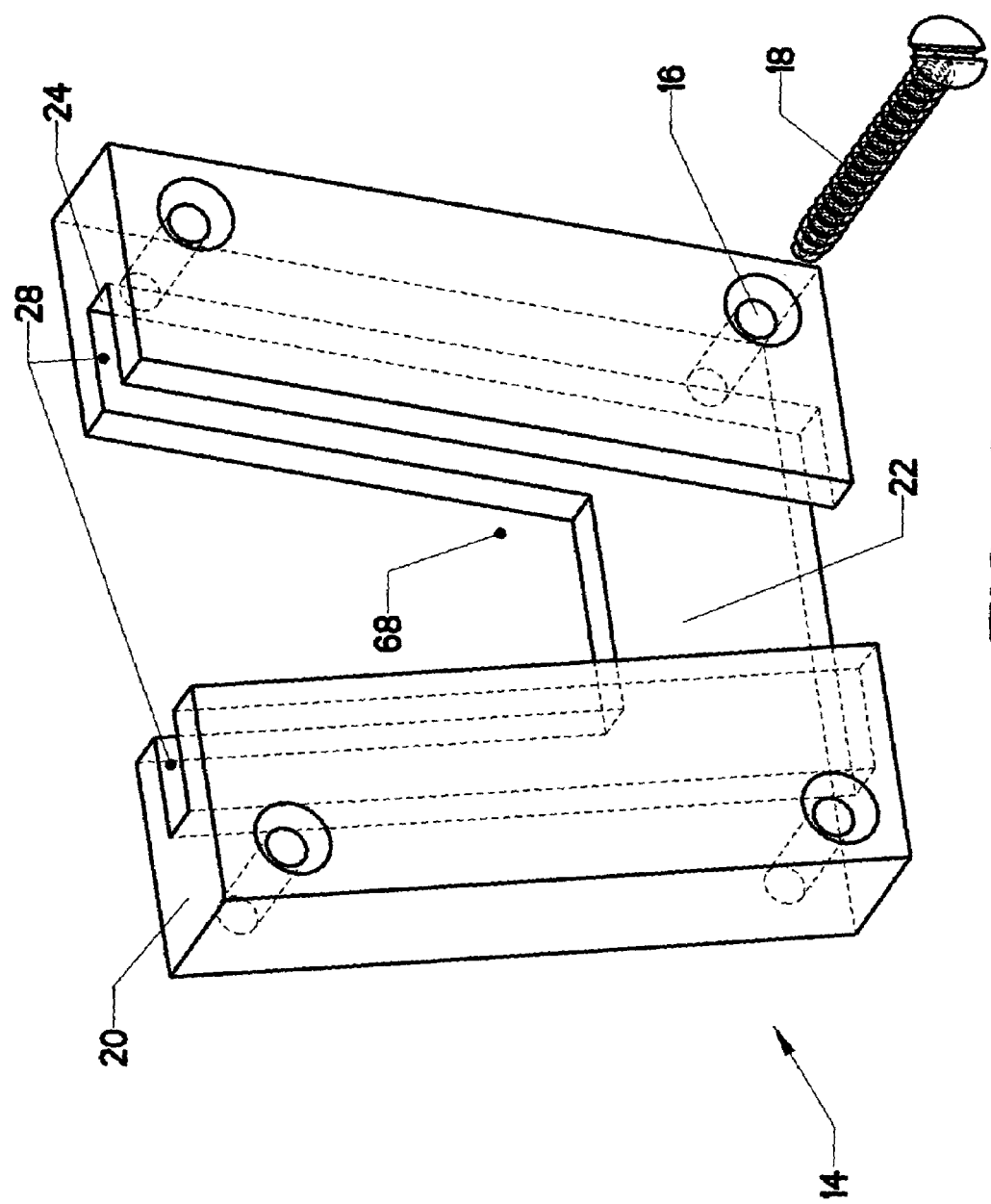
FIG. 2 is an isometric hidden line view, showing the receiver in more detail

FIG. 1 shows receiver 14 mounted on gunwale 12 of boat 10. The location of receiver 14 is selected by the user. It typically represents a position where the user needs to mount one or more pieces of equipment. FIG. 2 shows receiver 14 in more detail. It is mounted via passing four fasteners 18 through the four mounting holes 16. Receiver 14 then remains in position.

Figure 3:
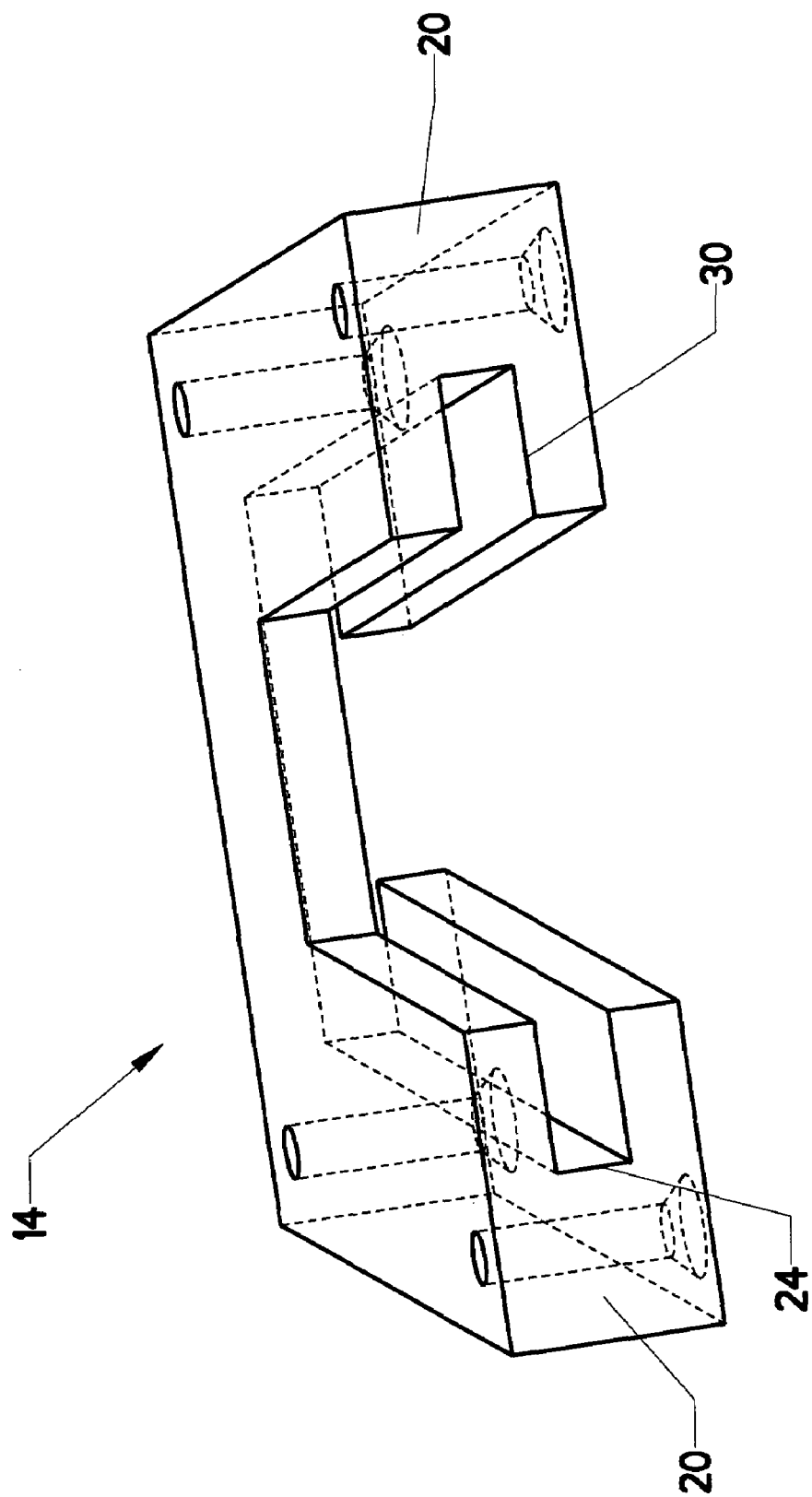
FIG. 3 is an isometric hidden line view, showing the receiver from a different perspective.

Upper surface 20 opens into slot 28, which descends downward. The slot is bounded by a back wall 22, two side walls 24, and a front wall 30 (see FIG. 3). In studying FIGS. 2 and 3, the reader will observe that the two side walls 24 taper inward to form a trapezoidal shape. The forward portion of slot 28 is left open to form open front 68.

Figure 4:
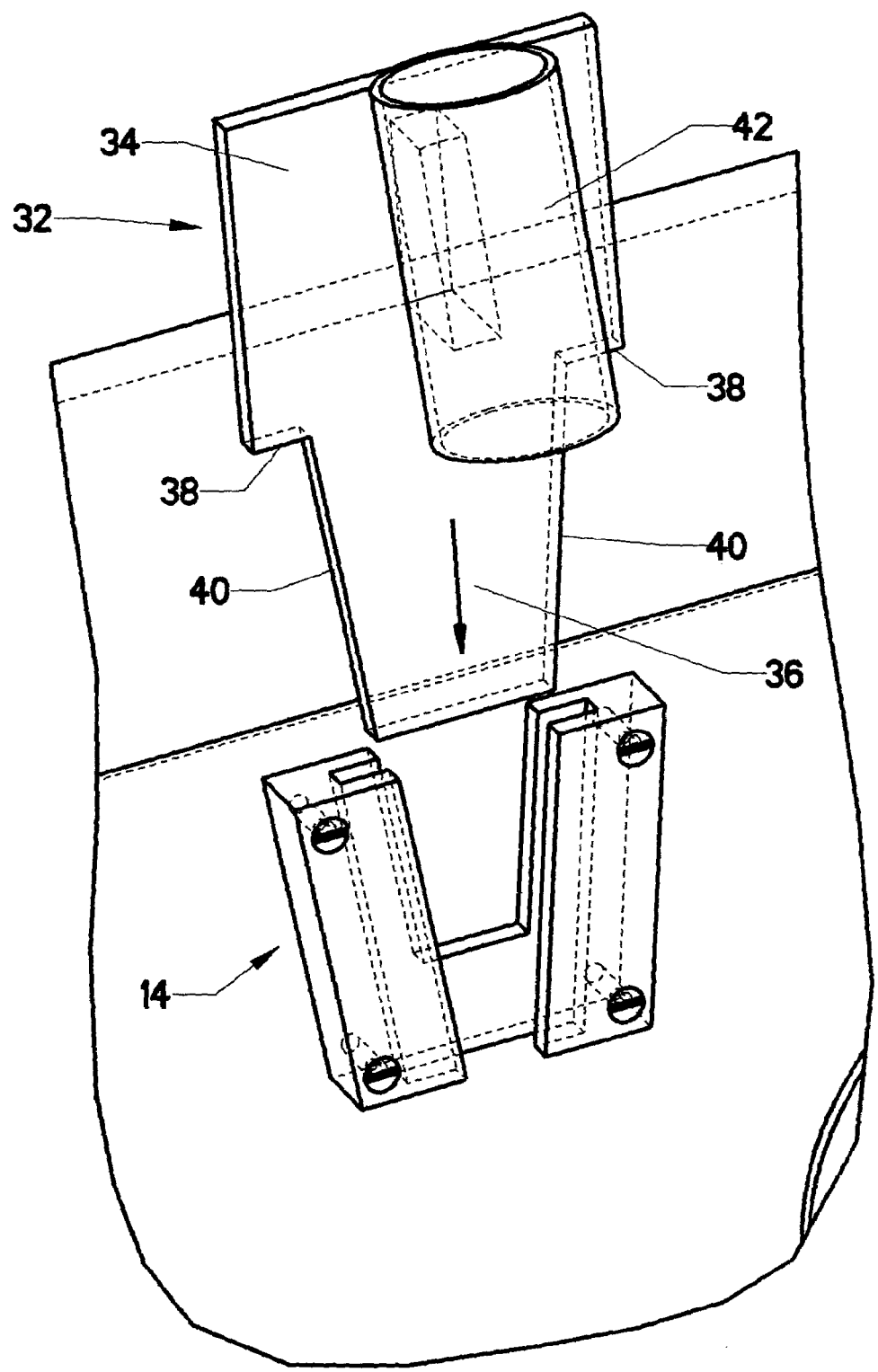
FIG. 4 is an isometric hidden line view, showing a modular mount being installed in a receiver.

FIG. 4 shows modular mount 32 ready to be installed in receiver 14. Modular mount 32 consists of plate 34 and a downward-descending tang 36. Two steps 38 are formed at the junction of tang 36 and plate 34. Tang 36 is bounded by a pair of side walls 40. These taper inward at the same angle found on the two side walls 24 within receiver 14. Modular mount 32 is installed by placing tang 36 into slot 28, then sliding modular mount 32 down in the direction indicated by the arrow.

Figure 5:
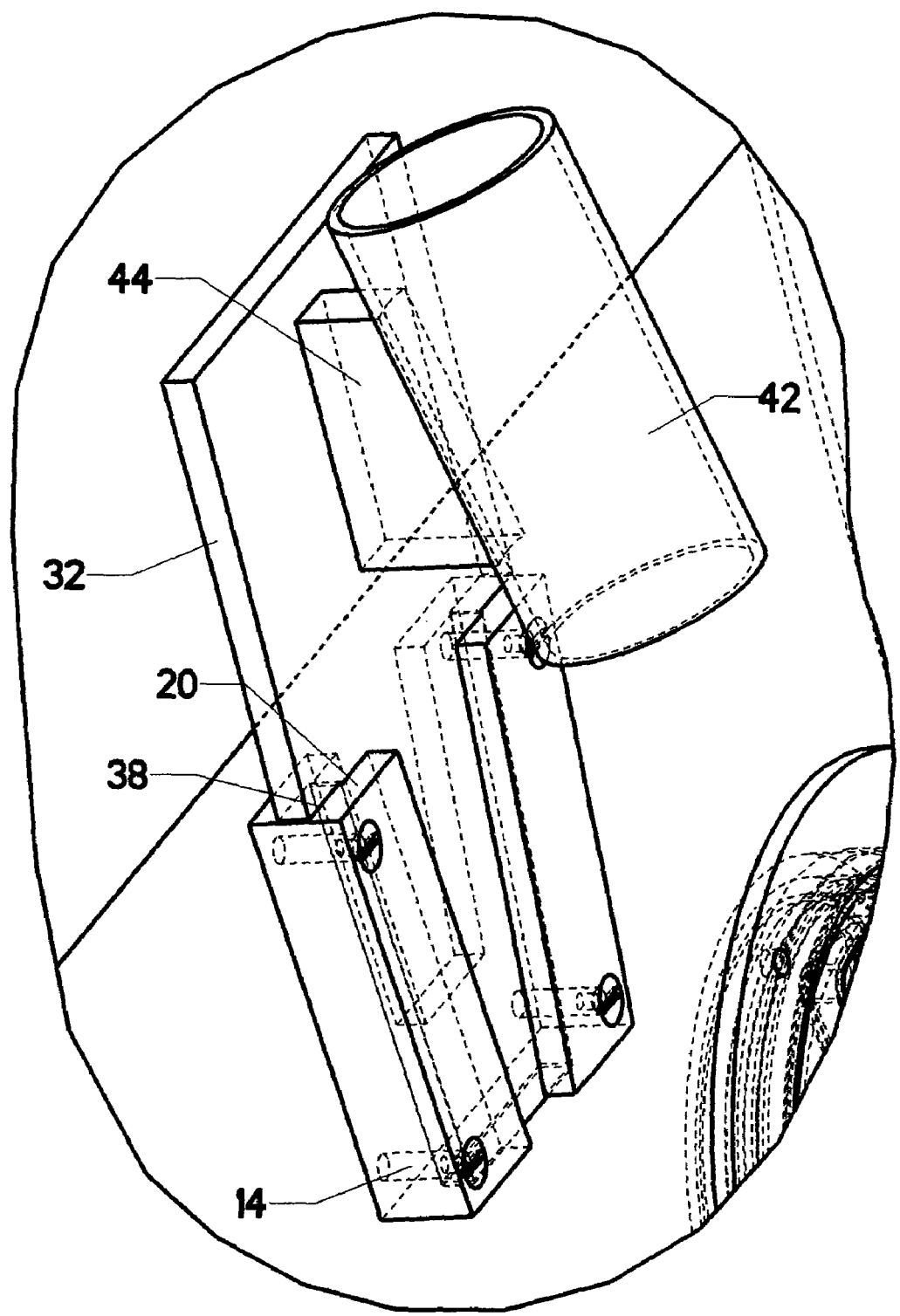
FIG. 5 is an isometric hidden line view, showing a modular mount installed in a receiver.

FIG. 5 shows modular mount 32 in its installed position. The interrelationship between side walls 40 and steps 38 is significant to the invention. The geometry is designed so that the two steps 38 will mate against top surface 20 just before the two side walls 40 on tang 36 mate against the two side walls 24 within receiver 14. Without this feature, the mating of the side walls can produce a wedging effect which firmly lodges tang 36 within receiver 14.

Modular mount 32 is intended to mount a variety of different devices. In the version shown, it mounts rod holder 42 via gusset 44. The user would typically place the handle of a fishing rod within rod holder 42 for trolling or other operations. Considerable force can then be placed on modular mount 32 when a fish strikes the line. Such forces can wedge modular mount 32 within receiver 14, making it difficult for the user to remove. However, the mating of steps 38 to top surface 20 prevents this problem. When steps 38 are hard against top surface 20, the two side walls 40 on tang 36 are preferably separated approximately 0.010 inches from the two side walls 24 within receiver 14. The two pairs of side walls are close enough to prevent any significant rotation of modular mount 32 within receiver 14, and to prevent modular mount 32 from separating from receiver 14. But, modular mount 32 will not become stuck within receiver 14.

Figure 6:
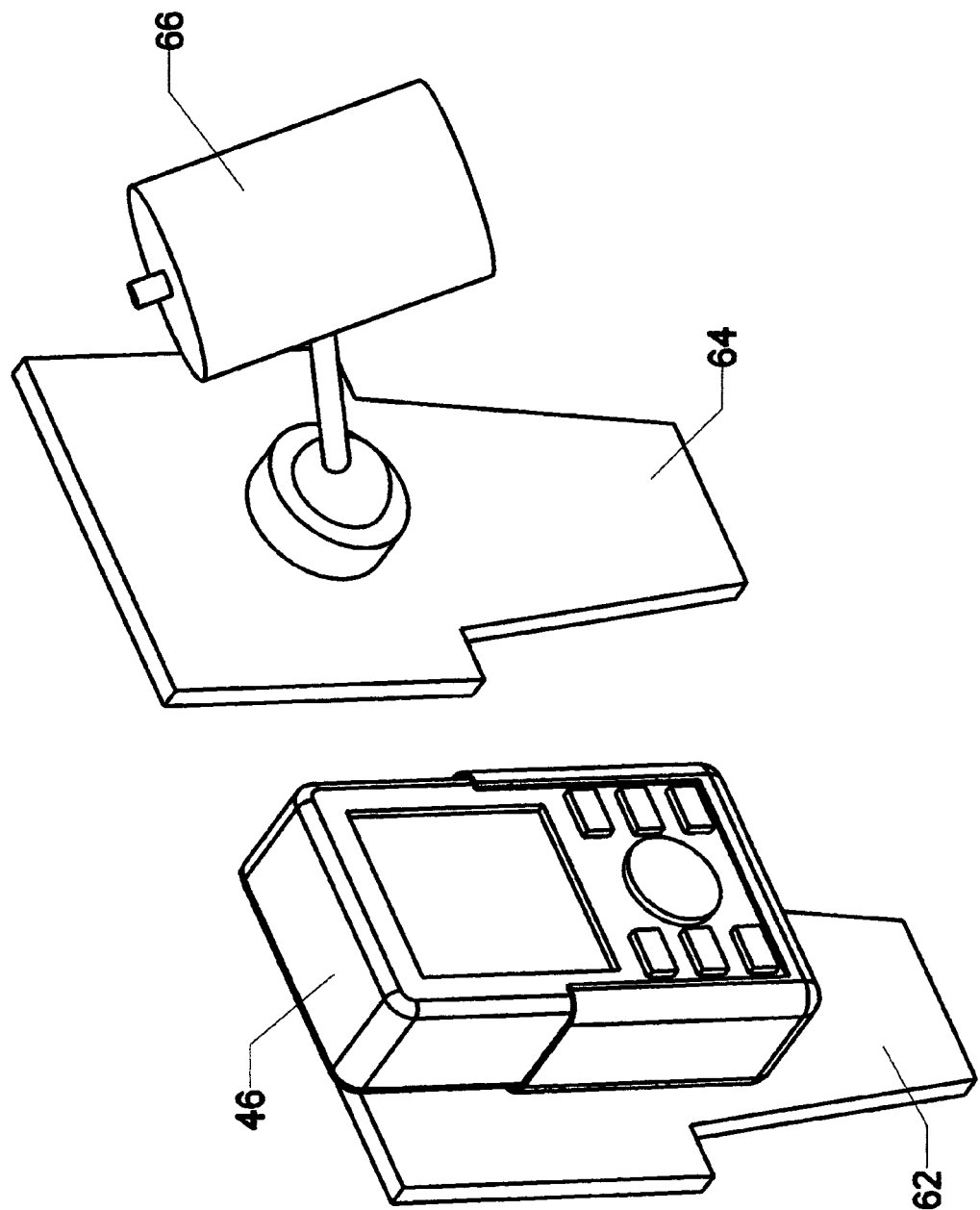
FIG. 6 is an isometric view, showing a variety of modular mounts.

A wide variety of attaching hardware can be combined with modular mount 32. FIG. 6 shows a version denoted GPS holder 62. It mounts a hollow rectangular shell sized to receive GPS unit 46. The user can leave GPS unit 46 attached to GPS holder 62. When he or she desires to use the GPS unit in the position on the boat shown in FIG. 1, he or she slips GPS holder 62 into receiver 14.

FIG. 6 also shows light holder 64 with attached light 66. This unit can also be placed in receiver 14. A small mast is included with a ball and socket joint in order to allow the user to point the light in a variety of directions. Of course, it may be desirable to provide electrical power to the light via a coiled cord or similar conductor. An electrical outlet can be provided next to receiver 14 for this purpose.

Figure 7:
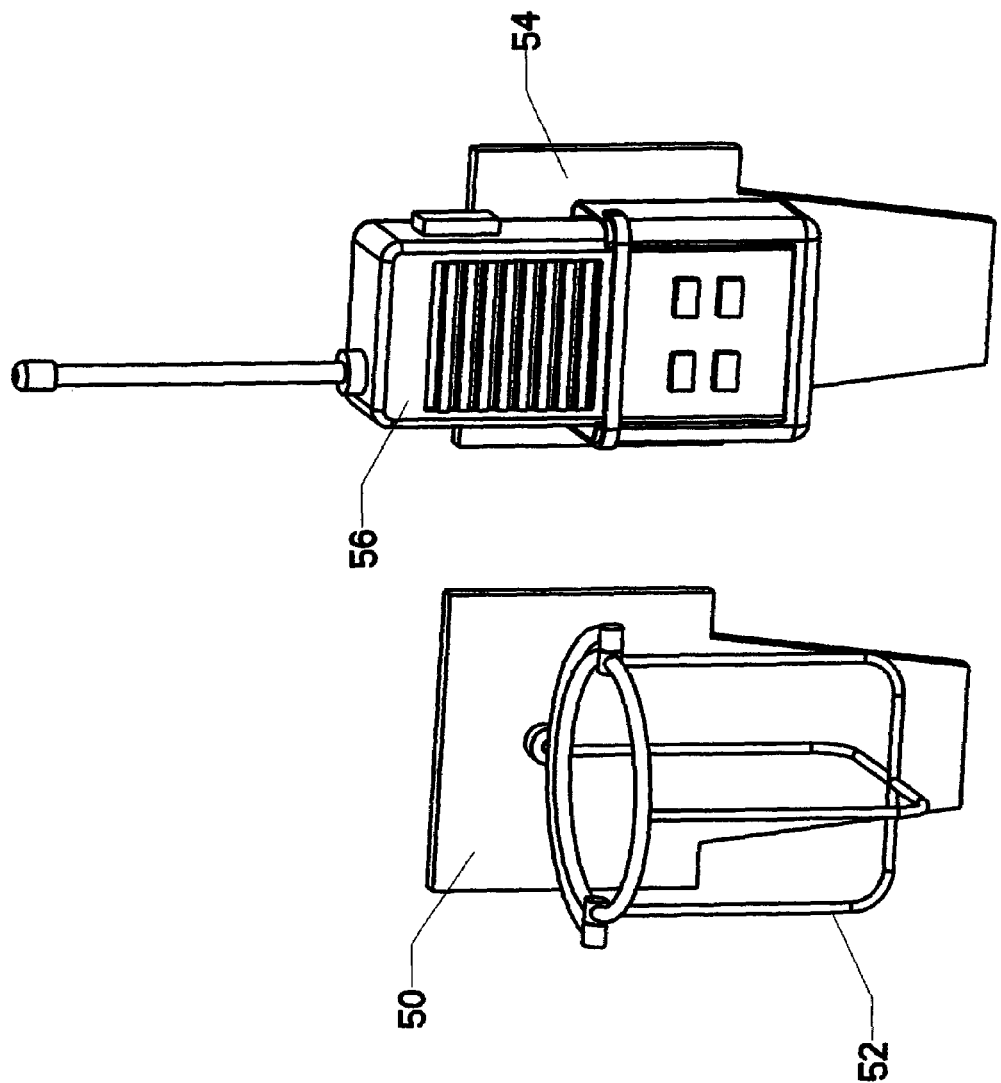
FIG. 7 is an isometric view, showing a variety of modular mounts.

FIG. 7 shows two more specialized holders attached to modular mount 32. Drink holder 50 mounts gimbaled drink mount 52. A beverage can may be placed inside gimbaled drink mount 52. The gimbals then move in roll, pitch, and yaw in order to hold the beverage can upright. Radio holder 54 holds radio 56 in a convenient position for use. A securing strap is provided, which allows the user to easily remove radio 56 for hand-held operation.

Figure 8:
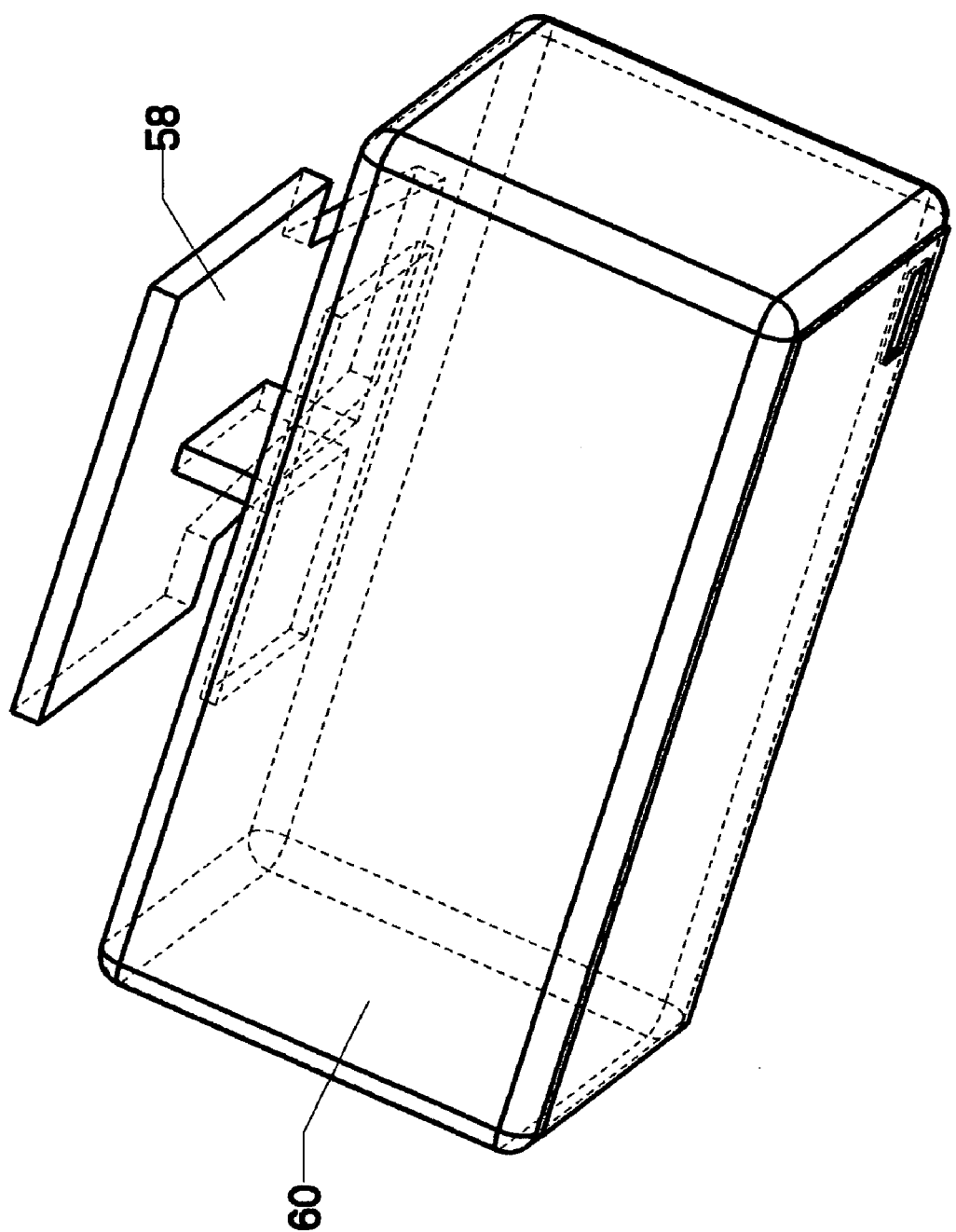
FIG. 8 is an isometric view, showing yet another type of modular mount.

FIG. 8 shows speaker 60 attached to speaker holder 58. Large and fairly heavy objects can be accommodated by the invention, since the mating of the modular mount to the receiver is capable of transmitting substantial loads.

Figure 9:
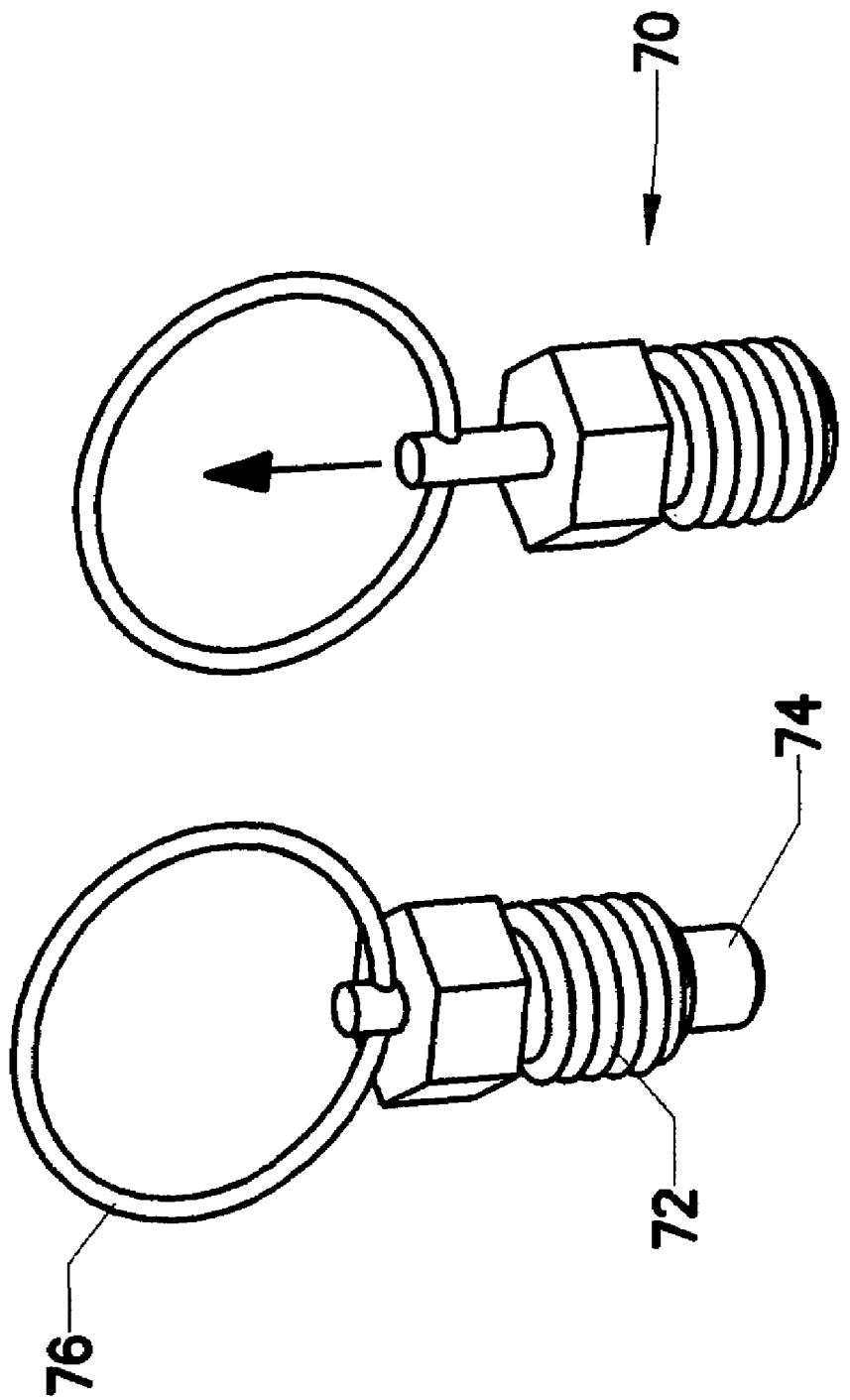
FIG. 9 is an isometric view, showing a pull pin.

In some applications it may be desirable to lock the modular mount within the receiver. Numerous prior art devices can be used to accomplish this objective. FIG. 9 shows two examples of one such piece of hardware—pull pin 70. This device includes plunger 74 within body 72. Plunger 74 is spring loaded so that it protrudes out the lower end (in the view as shown) of body 72. Ring 76 allows a user to grasp plunger 74 and pull it to the position shown in the right-hand of the two pull pins 70. FIG. 10 shows pull pin 70 installed in an appropriate position on receiver 14. A hole 78 is provided on side wall 40 of the modular mount. When the mount is placed in receiver 14, plunger 74 of pull pin 70 will snap into hole 78—thereby locking the modular mount in place. When the user wants to remove the modular mount, he or she grasps ring 76 and pulls it to release plunger 74. The modular mount can then be pulled free.

The reader should understand that the variety of mounting hardware shown is merely representative of the possibilities. A typical user might place four or more receivers around the boat. These can then be used to mount the desired devices, such as a pair of speakers, a GPS unit, and a light. One a device is no longer needed, the user can remove it by pulling the particular modular mount from its receiver. The device can then by safely stowed.

The preceding descriptions contain significant detail regarding the novel aspects of the present invention. They should not be construed, however, as limiting the scope of the invention but rather as providing illustrations of the preferred embodiments of the invention. Although the invention was created to fulfill a need in the field of boating, those skilled in the art will realize that it has equal application to other types of vehicles, including cars, trucks, aircraft, etc.

It also has applications extending far beyond vehicles. The devices shown could be used in a workshop by placing the receiver on a bench. A variety of shop equipment—such as bench grinders, vices, and lights—could then be placed in the receiver. Thus, the scope of the invention should be fixed by the following claims, rather than by the examples given.

We claim:

1. A device which allows a user to mount a variety of objects to a fixed point, comprising:
   a. a receiver, fixedly attached to said fixed point, wherein said receiver has
      i. a top surface;
      ii. a slot opening in said top surface and descending downward therefrom, having an upper portion and a lower portion;
      iii. wherein said slot is bounded by a back wall, a front wall, a first side wall, and a second side wall;
      iv. wherein said first and second side walls of said slot taper toward each other so that said upper portion of said slot is wider than said lower portion of said slot;
   b. a modular mount, including
      i. attachment means for fixedly attaching one of said variety of objects to said modular mount;
      ii. a plate;
      iii. a tang descending from said plate;
      iv. a first step proximate a junction between said tang and said plate;
      v. a second step proximate said junction between said tang and said plate;
      vi. wherein said tang has a back wall, a front wall, a first side wall, and a second side wall;

vii. wherein said first and second side walls of said tang taper toward each other so that said upper portion of said tang is wider than said lower portion of said tang;
viii. wherein said first side wall of said tang is oriented such that when said tang is inserted into said slot said first side wall of said tang will be parallel to said first side wall of said slot;
ix. wherein said second side wall of said tang is oriented such that when said tang is inserted into said slot said second side wall of said tang will be parallel to said second side wall of said slot;
x. wherein said first step is positioned to bear against said top surface while maintaining a small clearance between said first side wall of said tang and said first side wall of said slot;
xi. wherein said second step is positioned to bear against said top surface while maintaining a small clearance between said second side wall of said tang and said second side wall of said slot such that the first step and the second step together prevent the tang from being wedged into the tapered slot; and
xii. wherein the weight of said modular mount will tend to retain said tang in said slot.

2. A device as recited in claim 1, wherein said receiver has an open front in order to allow clearance for said mounting means.

3. A device as recited in claim 1, wherein:

a. said one of said variety of objects comprises a fishing rod; and b. said mounting means comprises a hollow and tubular rod holder attached to said modular mount.

* * * * *